US012032557B2

(12) United States Patent
Wu et al.

(10) Patent No.: US 12,032,557 B2
(45) Date of Patent: Jul. 9, 2024

(54) METHOD, DEVICE, AND COMPUTER PROGRAM PRODUCT FOR DATA MANAGEMENT

(71) Applicant: EMC IP Holding Company LLC, Hopkinton, MA (US)

(72) Inventors: Pengfei Wu, Shanghai (CN); Zhenzhen Lin, Shanghai (CN); Si Chen, Shanghai (CN); Ruixue Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 278 days.

(21) Appl. No.: 16/874,301

(22) Filed: May 14, 2020

(65) Prior Publication Data

US 2021/0342334 A1 Nov. 4, 2021

(30) Foreign Application Priority Data

Apr. 30, 2020 (CN) .......................... 202010367025.0

(51) Int. Cl.
*G06F 16/23* (2019.01)
*H04L 67/06* (2022.01)

(52) U.S. Cl.
CPC .......... *G06F 16/2379* (2019.01); *H04L 67/06* (2013.01)

(58) Field of Classification Search
CPC ......... G06F 16/23; G06F 16/14; G06F 16/182
See application file for complete search history.

(56) References Cited

U.S. PATENT DOCUMENTS

| 2010/0299687 | A1* | 11/2010 | Bertino-Clarke | H04L 67/1063 725/5 |
| 2010/0332401 | A1* | 12/2010 | Prahlad | H04L 63/0428 705/80 |
| 2015/0142745 | A1* | 5/2015 | Tekade | G06F 11/1451 707/646 |
| 2015/0205815 | A1* | 7/2015 | Vijayan | G06F 16/137 707/692 |

(Continued)

OTHER PUBLICATIONS

P. Maymounkov et al., "Kademlia: A Peer-to-Peer Information System Based on the XOR Metric," First International Workshop on Peer-to-Peer Systems (IPTPS), Mar. 7-8, 2002, 6 pages.

(Continued)

*Primary Examiner* — Maher N Algibhah
(74) *Attorney, Agent, or Firm* — Ryan, Mason & Lewis, LLP (57) ABSTRACT

A method, a device, and a computer program product for data management are provided in embodiments of the present disclosure. A method for data management comprises: acquiring, from a storage system, a torrent file associated with downloading of a target file, the target file being stored in the storage system, and the torrent file comprising at least a plurality of data digests of a plurality of data blocks of the target file; generating metadata for the plurality of data blocks based on the torrent file, the metadata being in a format supported by a unified management system, and the unified management system being configured for data access across the storage system and at least one other storage system; and storing the metadata for data-block-level access to the plurality of data blocks through the unified management system.

20 Claims, 6 Drawing Sheets

(56) References Cited

U.S. PATENT DOCUMENTS

| | | | |
|---|---|---|---|
| 2015/0244795 A1* | 8/2015 | Cantwell | H04L 12/1403 |
| | | | 709/202 |
| 2018/0137013 A1* | 5/2018 | Poojary | G06F 3/064 |
| 2018/0150640 A1* | 5/2018 | Li | G06F 21/6218 |
| 2018/0288154 A1* | 10/2018 | Ghazaleh | G06F 3/0659 |
| 2019/0286827 A1* | 9/2019 | Chang | G06F 16/178 |
| 2021/0081403 A1* | 3/2021 | Tian | G06F 3/0658 |

OTHER PUBLICATIONS

Amazon, "Using BitTorrent to Retrieve Objects Stored in Amazon S3," https://docs.aws.amazon.com/AmazonS3/latest/dev/S3TorrentRetrieve.html, 2020, 1 page.

U.S. Appl. No. 16/795,766 filed in the name of Ruixue Zhang et al. on Feb. 20, 2020, and entitled "Methods, Devices and Computer Program Products for Storing and Accessing Data."

\* cited by examiner

METHOD, DEVICE, AND COMPUTER PROGRAM PRODUCT FOR DATA MANAGEMENT

RELATED APPLICATION(S)

The present application claims priority to Chinese Patent Application No. 202010367025.0, filed Apr. 30, 2020, and entitled "Method, Device, and Computer Program Product for Data Management," which is incorporated by reference herein in its entirety.

FIELD

Embodiments of the present disclosure relate to the field of data storage, and in particular, to a method, an electronic device, and a computer program product for data management.

BACKGROUND

At present, as business and application requirements change, clients often need to store their data in different storage systems, especially in different cloud storage platforms. Different storage service providers generally provide different data access interfaces, and therefore, the clients need to interact with different interfaces. This is cumbersome and time-consuming. In this case, it is a trend to provide a unified management architecture for storage environments. The unified management architecture can allow the clients to manage different storage systems through a single interface to implement data storage, access, and management across a plurality of storage systems.

SUMMARY

A data management solution is provided in the embodiments of the present disclosure.

In a first aspect of the present disclosure, a method for data management is provided. The method comprises: acquiring, from a storage system, a torrent file associated with downloading of a target file, the target file being stored in the storage system, and the torrent file comprising at least a plurality of data digests of a plurality of data blocks of the target file; generating metadata for the plurality of data blocks based on the torrent file, the metadata being in a format supported by a unified management system, and the unified management system being configured for data access across the storage system and at least one other storage system; and storing the metadata for data-block-level access to the plurality of data blocks through the unified management system.

In a second aspect of the present disclosure, an electronic device is provided. The electronic device comprises a processor and a memory coupled to the processor and having instructions stored therein. When executed by the processor, the instructions cause the device to perform actions comprising: acquiring, from a storage system, a torrent file associated with downloading of a target file, the target file being stored in the storage system, and the torrent file comprising at least a plurality of data digests of a plurality of data blocks of the target file; generating metadata for the plurality of data blocks based on the torrent file, the metadata being in a format supported by a unified management system, and the unified management system being configured for data access across the storage system and at least one other storage system; and storing the metadata for data-block-level access to the plurality of data blocks through the unified management system.

In a third aspect of the present disclosure, a computer program product tangibly stored in a computer-readable medium and comprising computer-executable instructions is provided. When executed, the computer-executable instructions cause a device to acquire, from a storage system, a torrent file associated with downloading of a target file, the target file being stored in the storage system, and the torrent file comprising at least a plurality of data digests of a plurality of data blocks of the target file; generate metadata for the plurality of data blocks based on the torrent file, the metadata being in a format supported by a unified management system, and the unified management system being configured for data access across the storage system and at least one other storage system; and store the metadata for data-block-level access to the plurality of data blocks through the unified management system.

This Summary is provided to introduce the choice of concepts in a simplified form, which will be further described in the following Detailed Description. The Summary is neither intended to identify key features or major features of the present disclosure, nor intended to limit the scope of the present disclosure.

BRIEF DESCRIPTION OF THE DRAWINGS

The above and other objectives, features, and advantages of the present disclosure will become more apparent from the following description, in which example embodiments of the present disclosure are described in more detail with reference to the accompanying drawings. In the example embodiments of the present disclosure, identical reference numerals generally represent identical members.

DETAILED DESCRIPTION

Principles of the present disclosure will be described below with reference to several example embodiments shown in the accompanying drawings. Illustrative embodiments of the present disclosure are shown in the accompanying drawings. However, it should be understood that the embodiments are described only to enable persons skilled in the art to better understand and implement the present disclosure, but not to limit the scope of the present disclosure in any way.

The term "include" and its variants as used herein indicate open inclusion, i.e., "including, but not limited to." Unless specifically stated otherwise, the term "or" indicates "and/ or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, it is a trend to provide a unified management architecture for storage environments. The unified management architecture can allow clients to manage different storage systems through a single interface to implement data storage, access, and management across a plurality of storage systems.

Figure 1:
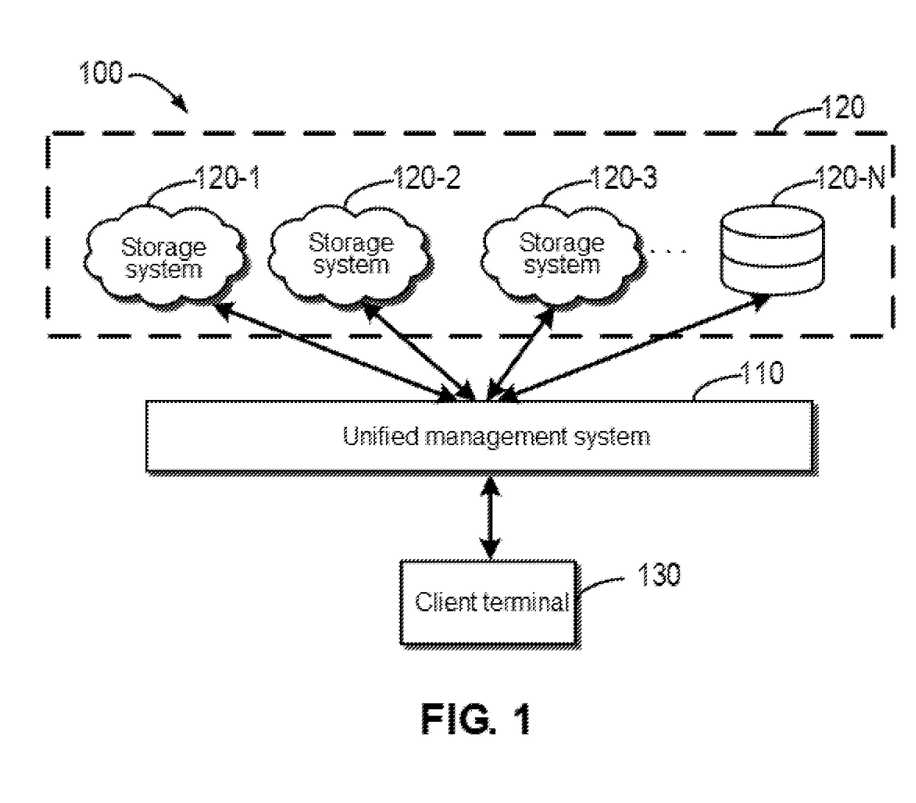
FIG. 1 is a schematic block diagram of an example storage environment in which an embodiment of the present disclosure can be implemented.

FIG. 1 is a schematic block diagram of example storage environment 100 in which an embodiment of the present disclosure can be implemented. In environment 100 of FIG. 1, unified management system 110 is deployed to manage a plurality of storage systems 120-1, 120-2, 120-3, . . . , and 120-N (hereinafter collectively or individually referred to as storage system 120), wherein N is an integer greater than or equal to 2.

The plurality of storage systems 120 may be of different types and may be from different providers. The plurality of storage systems 120 have certain data storage and computing capabilities. In some embodiments, the plurality of storage systems 120 may include one or more cloud storage services that may be provided by one or more cloud service providers. In some embodiments, the plurality of storage systems 120 may further include one or more local or remote file systems (FS), a database (DB), and so on.

The plurality of storage systems 120 may have their respective data storage and access mechanisms, and thus need to be accessed through their respective data access interfaces, such as different application program interfaces (APIs). Unified management system 110 is deployed in such a way that client terminal 130 can achieve unified access to the plurality of storage systems 120 through a unified interface of unified management system 110. In an operation, client terminal 130 may store data expected to be stored to various storage systems 120 through unified management system 110. Client terminal 130 may also directly send a data access request (reading, writing, modifying data, etc.) to unified management system 110, and unified management system 110 initiates a corresponding data access operation to the plurality of storage systems 120.

Unified management system 110 may achieve communication coupling with each storage system 120 via a wired network, a wireless network, or a combination of the two. Client terminal 130 may achieve communication coupling with unified management system 110 also via a wired network, a wireless network, or a combination of the two.

An important aspect of achieving data access to a storage system is maintenance of metadata associated with stored data. Herein, the metadata refers to information sufficient to provide access to the associated data. From the perspective of metadata management, unified management system 110 may be implemented in a centralized or distributed architecture. In the implementation of the centralized architecture, unified management system 110 stores and manages, in a centralized manner, metadata stored in the plurality of storage systems 120. In the implementation of the distributed architecture, unified management system 110 may be implemented in a plurality of computing devices (such as a plurality of edge computing nodes or servers), wherein storage and management of metadata is distributed to the plurality of computing devices for implementation.

Regardless of the implementation manner, unified management system 110 generally has a corresponding metadata format requirement. In some implementations, unified management system 110 may provide data access based on a data block level to allow storing different data blocks divided from the same file across a plurality of storage systems and allow client terminal 130 to access the data blocks one by one. This enables more flexible data access and more efficient utilization of a storage space.

It should be understood that the storage environment shown in FIG. 1 is only an example. In an actual application, additional or alternative components may exist in the storage environment, or the components may be arranged in another manner. For example, in some embodiments, one or more storage systems may be local storage systems of a client terminal, although they are shown as separate components.

The deployment of the unified management system can bring numerous advantages to data management and access of the client terminal. Because of requirements on the metadata management, if the data is stored in the storage system through the unified management system, the unified management system generally can effectively build metadata for the new data. However, for data that has been stored in some storage systems previously, because the data is not stored through a unified management architecture, there is a lack of metadata to implement access to the data. How to manage the existing data through the unified management architecture is a problem.

A simple solution is to download the existing data from the storage systems and then upload and store the data again through the unified management system, so that the unified management system can accordingly build required metadata. However, this process requires large amounts of data transfer (including uploading and downloading), which is time-consuming and error-prone. In addition, for systems such as those based on cloud storage services, there may be additional fees for data downloading and uploading.

Therefore, illustrative embodiments disclosed herein provide a more efficient solution to support integration of stored data into a unified management architecture for management while also implementing data-block-level access.

According to an embodiment of the present disclosure, a solution for implementing data in a unified management architecture across a plurality of storage systems is provided. According to the solution, a torrent file associated with downloading of a target file, for example, metadata in a BitTorrent (BT) format, is acquired from a storage system. The torrent file includes at least a plurality of data digests of a plurality of data blocks of the target file, which can be configured to generate metadata in a format supported by a unified management system. The generated metadata is stored for data-block-level access to the plurality of data blocks through the unified management system.

In this way, on the basis of metadata about stored data that can be provided by the storage system, the metadata in the format supported by the unified management system can be obtained by metadata conversion, for supporting an expected data access manner. In such a solution, the target file itself does not need to be actually downloaded and uploaded, thus saving time and economic cost.

The example embodiments of the present disclosure are described below with reference to the accompanying drawings.

Figure 2:
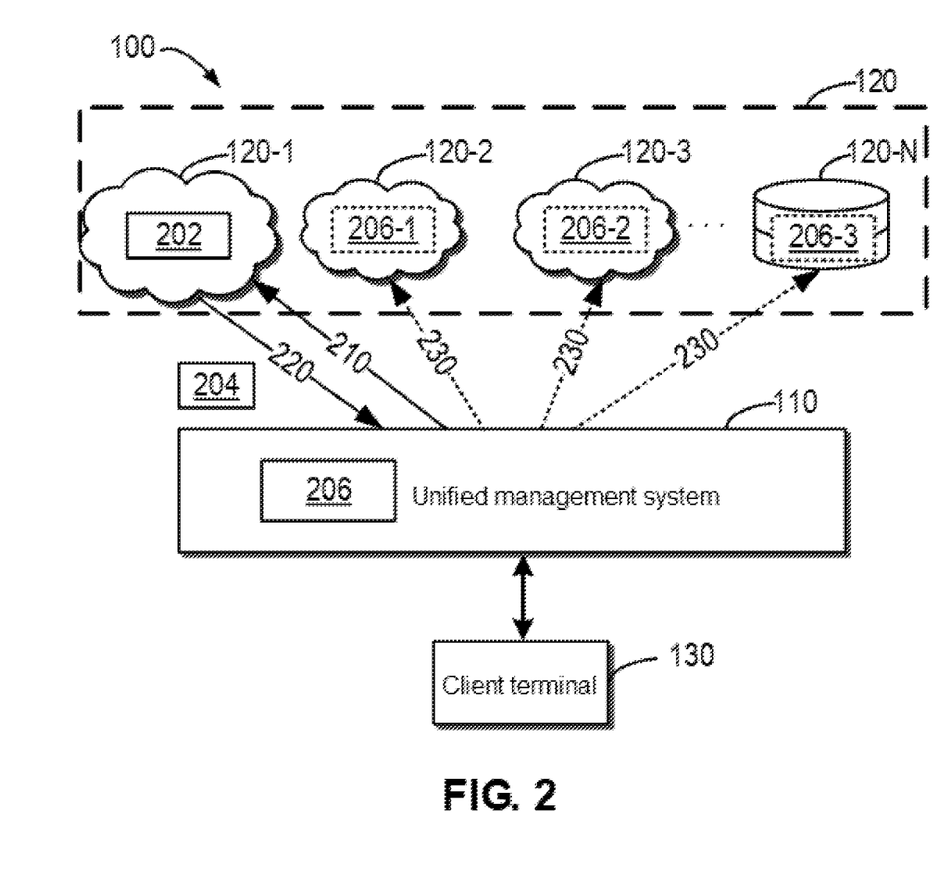
FIG. 2 is a schematic diagram of an example process of implementing data management in a unified management architecture according to an embodiment of the present disclosure.

FIG. 2 is a schematic diagram of an example process of implementing data management in a unified management architecture according to an embodiment of the present disclosure. For ease of discussion, this process is illustrated on the basis of the example unified management architecture in FIG. 1.

In an embodiment of the present disclosure, it is assumed that storage system 120-1 stores data in the granularity of files, and that the data stored therein is not stored through unified management system 110. For example, before unified management system 110 is deployed to implement management across a plurality of storage systems 120, storage system 120-1 may have stored some data through an access interface specific to storage system 120-1. For example, it is assumed that storage system 120-1 stores target file 202. According to an embodiment of the present disclosure, unified management system 110 can establish metadata for target file 202 that has been stored in storage system 120-1 without downloading target file 202 from storage system 120-1 to the local storage system for processing.

Specifically, unified management system 110 requests 210 torrent file 204 associated with downloading of target file 202 from storage system 120-1, and acquires 220 torrent file 204 from storage system 120-1. Unified management system 110 may send the request and obtain torrent file 204 through an access interface in communication with storage system 120-1 (for example, by calling a corresponding API).

In order to provide a torrent file for downloading of a particular file, storage system 120-1 generally supports file transfer using a peer-to-peer protocol. An example of the peer-to-peer protocol is a BT protocol. Numerous storage systems can support such a protocol, such as a Simple Storage Service (S3)-based storage system. A more specific example of the S3-based storage system is an Amazon S3 cloud storage platform. However, it should be understood that the example mentioned here is not restrictive. This embodiment of the present disclosure is applicable to any storage system that supports a peer-to-peer protocol, such as a BT protocol.

The main principle of the peer-to-peer protocol is to logically divide a file available for downloading into a plurality of data blocks and write a data digest of each data block to a torrent file, for supporting a multi-source file transfer mechanism. Therefore, the torrent file may be used as an "index" of a to-be-downloaded file. In this embodiment of the present disclosure, useful information included in torrent file 204 may be configured to effectively build metadata required by unified management system 110.

Generally, the torrent file includes two parts, namely, tracker server information and file information. The tracker server information mainly includes an address of a tracker server to be used in downloading and settings for the tracker server, and the file information includes information associated with the target file. The file information may include, for example, a file name, a file size (for example, in bytes), a data block size (for example, in bytes), a data digest of each data block, and so on. The data digest may include a hash value of the data block. A variety of hash algorithms may be used for calculating a hash value, such as a SHA-1 hash function.

Figure 3:
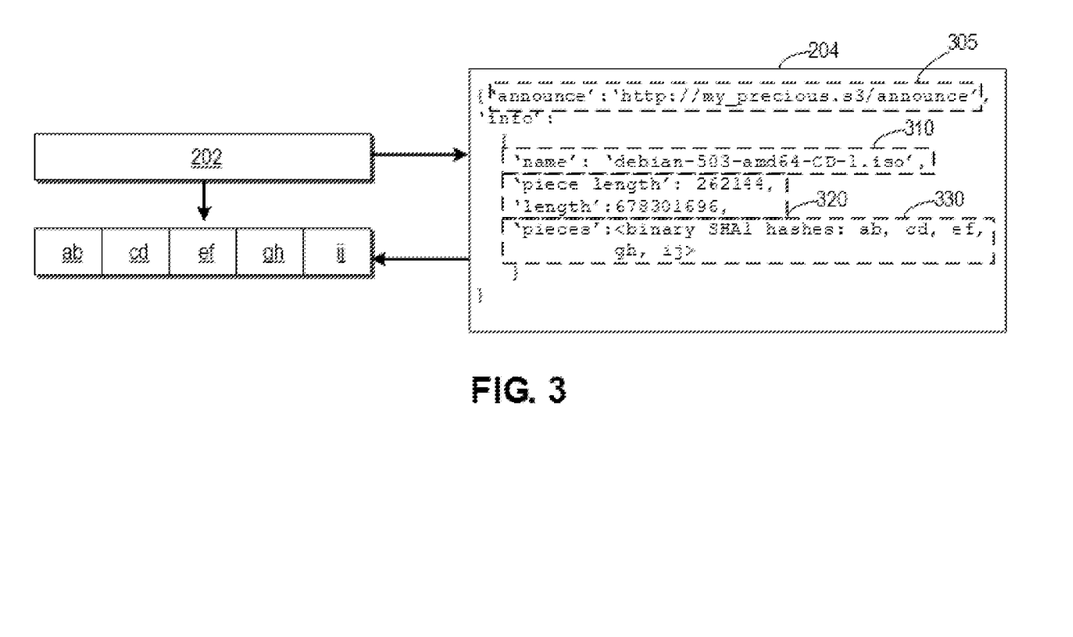
FIG. 3 illustrates an example of a torrent file according to some embodiments of the present disclosure.

FIG. 3 illustrates an example of torrent file 204 associated with downloading of target file 202. It is assumed that target file 202 is named "debian-503-amd64-CD-1.iso." Torrent file 204 includes tracker server information 305, and further includes file information including file name section 310 (indicating the file name debian-503-amd64-CD-1.iso), size related section 320 (indicating that the data block size is 262,144 bytes and the file size is 678,301,696 bytes), and data digest section 330 (indicating hash values of data blocks). In the example of FIG. 3, hash values of a plurality of data blocks (five data blocks in the example) of target file 202 are indicated with ab, cd, ef, gh, and ij respectively. However, it should be understood that an actual hash value may be represented as a binary string.

It should be noted that it can be seen according to torrent file 204 that target file 202 is logically divided into a plurality of data blocks, but in fact, data in target file 202 may not be stored as data blocks in storage system 120-1, and data-block-level access is not supported.

It should be understood that torrent file 204 shown in FIG. 3 is for explanatory purposes only and does not pose any restrictions on the embodiments of the present disclosure. Target file 202 may be logically divided into more or fewer data blocks according to another size, and torrent file 204 may further include other information.

After torrent file 204 is obtained from storage system 120-1, unified management system 110 generates metadata 206 for the plurality of data blocks of target file 202 based on torrent file 204. Unified management system 110 may have a metadata format supported by itself, and thus useful information can be extracted from torrent file 204 to build metadata 206 in the corresponding format. Such metadata 206 is stored for subsequent data-block-level access to target file 202. As mentioned above, torrent file 204 includes at least corresponding data digests of the plurality of data blocks. Unified management system 110 may generate required metadata by using the information.

A size of the torrent file 204 is generally very small, especially compared with the size of target file 202. Therefore, according to embodiments of the present disclosure, existing data in a storage system can be integrated into the unified management system more efficiently and quickly at a small cost (for example, only a small amount of data needs to be downloaded from storage system 120-1).

When metadata 206 is generated, unified management system 110 extracts the corresponding data digests of the plurality of data blocks of target file 202 from torrent file 204, and determines corresponding storage positions of the plurality of data blocks in storage system 120-1 at least based on the data digests (for example, the hash values of the data blocks). Unified management system 110 determines metadata 206 as being capable of indicating mapping of the plurality of data digests to the plurality of storage positions. It should be understood that on the basis of torrent file 204, especially on the basis of the plurality of data digests, the storage positions of the various data blocks can be determined by following provisions of the BT protocol. This is well known to persons skilled in the art, especially persons skilled in the field of peer-to-peer data transfer.

In some embodiments, if unified management system 110 supports an arrangement in which metadata 206 of the plurality of data blocks is organized in a hierarchical structure format, for target file 202, unified management system 110 can create a hierarchical structure based on the plurality of data digests when generating metadata 206. In an implementation where the plurality of data digests include hash values of the plurality of data blocks, such a hierarchical structure includes a hash tree, such as a Merkle tree, also referred to as a Merkle directed acyclic graph (DAG). In such a hierarchical structure, a plurality of leaf nodes are configured to indicate the plurality of data digests, one or more hierarchies may continue to be built on the plurality of leaf nodes, nodes at each hierarchy point to a plurality of nodes at a next hierarchy, and an additional data digest is generated based on data digests indicated by the pointed nodes.

Figure 4:
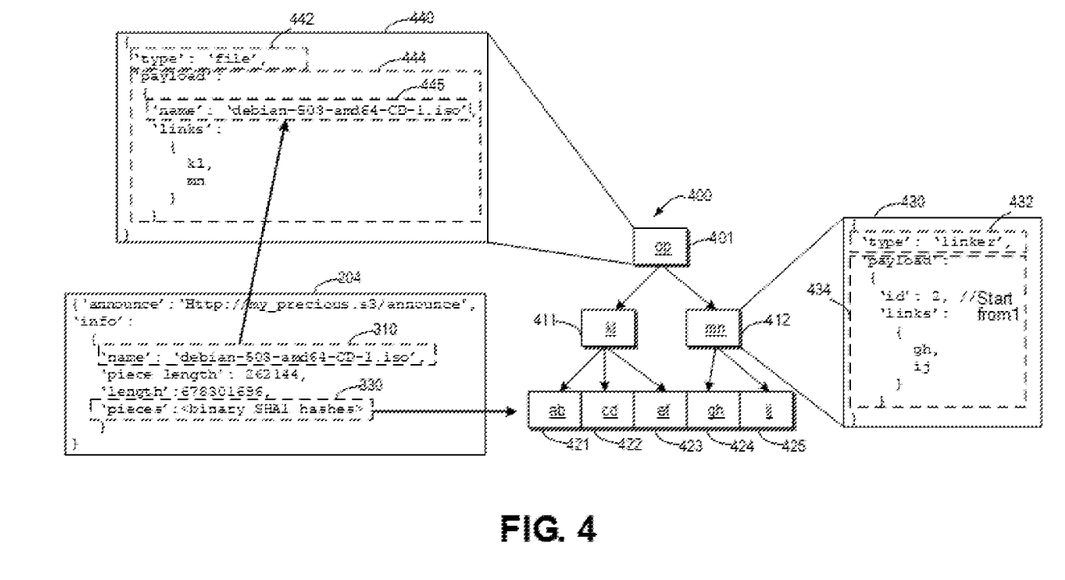
FIG. 4 illustrates an example of metadata in a hash tree structure according to some embodiments of the present disclosure.

FIG. 4 illustrates metadata 206 in a hash tree structure. In the example, metadata 206 includes hash tree 400. Leaf nodes 421 to 425 of hash tree 400 indicate a plurality of hash values of the plurality of data blocks of target file 202 respectively, and the hash values are from data digest section 330 of torrent file 204. Leaf nodes 421 to 425 are each associated with one of nodes 411 and 412. Node 411 is constructed as a parent node of leaf nodes 421, 422, and 423 and indicates a hash value "kl." The hash value is generated based on hash values "ab," "cd," and "ef" of leaf nodes 421, 422, and 423. Node 412 is constructed as a parent node of leaf nodes 424 and 425 and indicates a hash value "mn." The hash value is generated based on hash values "gh" and "ij" of leaf nodes 424 and 425. Hash tree 400 further includes root node 401 that is constructed as a parent node of nodes 411 and 412 and indicates a hash value "op." The hash value is generated based on hash values "kl" and "mn" of nodes 411 and 412.

The hash values of leaf nodes 421 to 425 of hash tree 400 are mapped to the storage positions of the data blocks of target file 202. In such mapping, the hash values and the storage positions may be considered as a <key, value> pair, and the corresponding storage positions can be indexed through the hash values, so as to achieve data access.

In addition to the hash values, other nodes of hash tree 400 may further indicate other metadata. For example, FIG. 4 illustrates metadata section 430 of node 412. The metadata section includes: type field 432 indicating that a type of node 412 is a linker; and payload field 434 including an identification (id) of the node and hash values of the linked nodes (links), that is, gh and ij. Although not shown, node 411 also indicates a similar metadata section.

Metadata section 440 of the root node of hash tree 400 also similarly includes type field 442 indicating that a type of node 401 is a file; and payload field 444 including file identification information 445 (for example, file name debian-503-amd64-CD-1.iso) of target file 202 and hash values of the linked nodes (links), that is, kl and mn. File identification information 445 is extracted from file name section 310 of torrent file 204. Although not shown, payload section 444 may further include other information that can be extracted from torrent file 204, such as a file size, a data block size, and other information included in torrent file 204. The information may be configured for other purposes during subsequent data access to target file 202. For example, information such as the file size and the block size can be configured to verify read data.

By building such a hierarchical structure as in FIG. 4, one or more data blocks of target file 202 can be accessed as required from the root node, thus achieving data-block-level data access.

In some embodiments, with the exception of the leaf nodes in the hierarchical structure (for example, the hash tree in FIG. 4), information indicated by other nodes can be stored as data blocks in storage system 120 managed by unified management system 110. For example, FIG. 2 illustrates that unified management system 110 stores 230 some metadata sections 206-1, 206-2, and 206-3 of metadata 206 to storage systems 120-2, 120-3, and 120-N. Metadata sections 206-1, 206-2, and 206-3 may correspond to metadata sections indicated by nodes 401, 411, and 412 of hash tree 400 respectively, including metadata sections 440 and 430.

In an embodiment where metadata sections indicated by hierarchical nodes are stored to the storage system, data digests indicated by the nodes can be mapped to storage positions of the metadata sections. As mentioned above, the leaf nodes in the hierarchical structure are mapped to the storage positions of the data blocks of target file 202 in storage system 120-1. In this way, the hash values indicated by the nodes in the hierarchical structure (for example, hash tree 400) are mapped to the corresponding storage positions to form a plurality of <key, value> pairs. The <key, value> pairs corresponding to the nodes of hash tree 400 are listed in Table 1 below.

TABLE 1

<key, value> pair

| key | value |
|---|---|
| ab | https://my-precious-bucket.s3.amazonaws.com/ . . . /data:bt-part-1 |
| cd | https://my-precious-bucket.s3.amazonaws.com/ . . . /data:bt-part-2 |
| ef | https://my-precious-bucket.s3.amazonaws.com/ . . . /data:bt-part-3 |
| gh | https://my-precious-bucket.s3.amazonaws.com/ . . . /data:bt-part-4 |
| lj | https://my-precious-bucket.s3.amazonaws.com/ . . . /data:bt-part-5 |
| kl | http://mystorageaccount.blob.core.windows.net/mycontainer/kl |
| mn | https://my-precious-bucket.s3.amazonaws.com/ . . . /mn |
| op | IPFS-NODE-ID |

It should be understood that hash tree 400 in FIG. 4 and storage positions of the data blocks listed in Table 1, as well as storage positions of the hash values (for example, "kl," "mn," and "op") of the parent nodes of the hash tree, are merely examples, and are not any restrictions on the embodiments of the present disclosure. Hash tree 400 may have more hierarchical structures, and each parent node may point to more child nodes. Storage positions indicated by the hash values "kl," "mn," and "op" in Table 1 may vary according to specific storage requirements on the metadata sections. For example, in some examples, metadata sections 430, 440, and so on as shown in FIG. 4 may be stored in a centralized manner rather than distributed in a plurality of storage systems. In some embodiments, depending on specific storage positions of the data blocks or metadata sections, unified management system 110 may need to request access to the data blocks or metadata sections through an access interface of corresponding storage system 120.

After metadata 206 has been built and stored, unified management system 110 may access one or more of the plurality of data blocks of target file 202 based on metadata 206. By building the metadata, unified management system 110 may perform data-block-level access to target file 202 that has been stored in storage system 120-1. Thus, client terminal 130 may request downloading one or more data blocks without downloading the entire file. In addition, data-block-level access can further improve security of data access and can support peer-to-peer data transfer and multi-threaded downloading, thus improving the efficiency of data access.

Specifically, during the data access, if client terminal 130 expects to access one data block in target file 202, unified management system 110 may extract a data digest (for example, a hash value) of the data block from the request. Then, a matched hash value is determined by comparing the obtained hash value with hash values of various nodes in the hash tree (such as hash tree 400 in FIG. 4). The matching of the hash value may start from the root node and go down layer by layer. In the comparison with each node, unified management system 110 may determine a metadata portion indicated by each node through the mapping in Table 1. If the hash value in the request matches a hash value of a leaf node in the hash tree, unified management system 110 may determine, from Table 1, a storage position of a data block associated with the leaf node, thereby performing access (for example, reading, updating, moving, deleting, and so on) to the data block based on the storage position.

Figure 5:
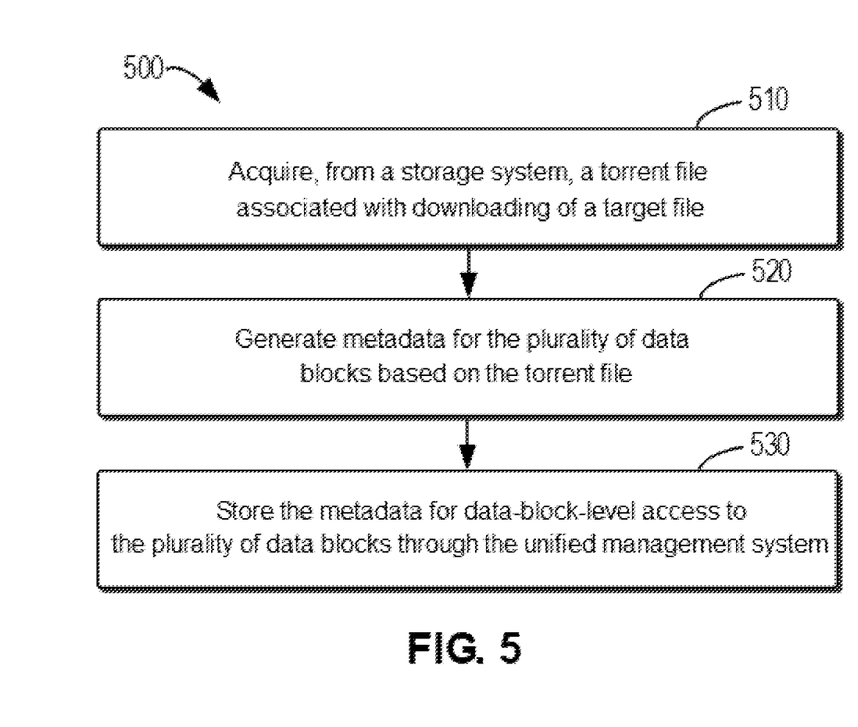
FIG. 5 is a flowchart of a process for data management according to some embodiments of the present disclosure.

FIG. 5 is a flowchart of process 500 for data management according to some embodiments of the present disclosure. Process 500 may be implemented at unified management system 110 in FIG. 2. For ease of description, process 500 is described with reference to FIG. 2.

In block 510, unified management system 110 acquires, from a storage system, a torrent file associated with downloading of a target file. The target file is stored in the storage system, and the torrent file includes at least a plurality of data digests of a plurality of data blocks of the target file. In block 520, unified management system 110 generates metadata for the plurality of data blocks based on the torrent file. The metadata is in a format supported by the unified management system, and the unified management system is configured for data access across the storage system and at least one other storage system. In block 530, unified management system 110 stores the metadata for data-block-level access to the plurality of data blocks through the unified management system.

In some embodiments, generating the metadata includes: extracting the plurality of data digests from the torrent file; determining a plurality of storage positions of the plurality of data blocks in the storage system at least based on the plurality of data digests; and generating second metadata to indicate mapping of the plurality of data digests to the plurality of storage positions.

In some embodiments, generating the metadata further includes: creating a hierarchical structure based on the plurality of data digests, a plurality of leaf nodes of the hierarchical structure indicating the plurality of data digests respectively, and a parent node of the plurality of leaf nodes indicating an additional data digest generated based on at least two of the plurality of data digests.

In some embodiments, the plurality of data digests include hash values of the plurality of data blocks, and the hierarchical structure includes a hash tree.

In some embodiments, generating the metadata further includes: extracting file identification information of the target file from the torrent file; and determining a root node of the hierarchical structure based on the file identification information to map a data digest indicated by the root node to a storage position of the file identification information.

In some embodiments, the first format includes a BT format, and acquiring the torrent file includes: initiating a request for the torrent file of the target file to the storage system through the unified management system.

In some embodiments, process 500 further includes: in response to an access request for a target data block in the plurality of data blocks, accessing the target data block from the storage system based on the metadata.

Figure 6:
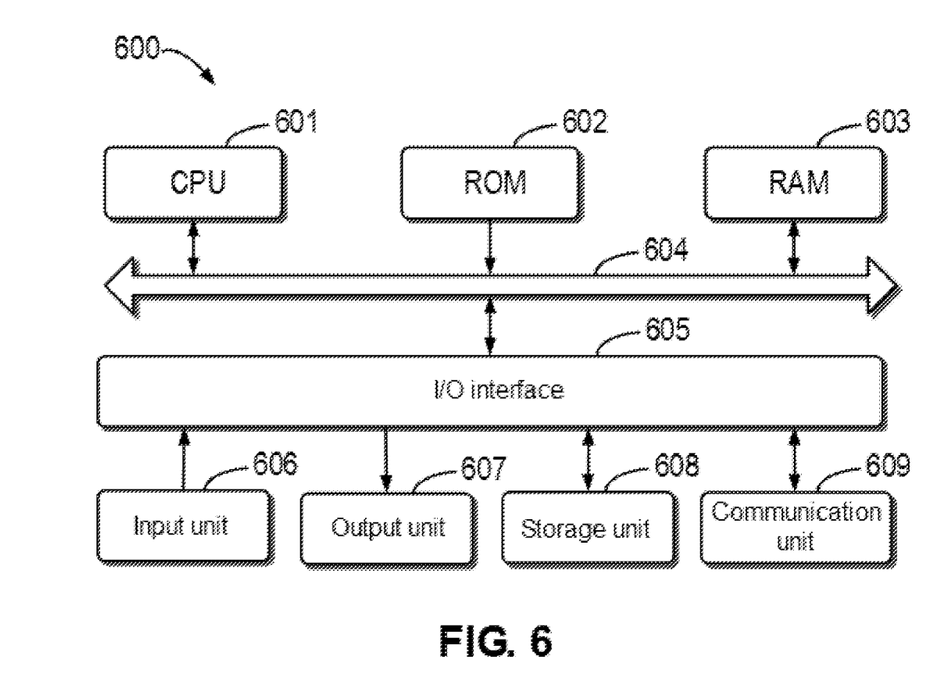
FIG. 6 is a block diagram of an example device that can be configured to implement an embodiment of the present disclosure.

FIG. 6 is a schematic block diagram of example device 600 that can be configured to implement an embodiment of the present disclosure. Device 600 may be a general-purpose computing device, an edge computing node, a server, a mainframe, or the like. Device 600 may be implemented or included in unified management system 110 in FIG. 2. For example, unified management system 110 may include one or more devices 600.

As shown in the figure, device 600 includes central processing unit (CPU) 601 that may perform various appropriate actions and processing according to computer program instructions stored in read-only memory (ROM) 602 or computer program instructions loaded from storage unit 608 to random access memory (RAM) 603. In RAM 603, various programs and data required for the operation of device 600 may also be stored. CPU 601, ROM 602, and RAM 603 are connected to each other through bus 604. Input/output (I/O) interface 605 is also connected to bus 604.

A plurality of components in device 600 are coupled to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as the Internet and/or various telecommunication networks.

CPU 601 performs the various methods and processing described above, for example, process 500. For example, in some embodiments, process 500 may be implemented as a computer software program or a computer program product that is tangibly included in a machine-readable medium, such as a non-transitory computer-readable medium, for example, storage unit 608. In some embodiments, some or all of the computer program may be loaded and/or installed onto device 600 through ROM 602 and/or communication unit 609. When the computer program is loaded into RAM 603 and executed by CPU 601, one or more steps of process 500 described above may be implemented. Alternatively, in other implementations, CPU 601 can also be configured in any other suitable manner (e.g., by means of firmware) to implement process 500.

Persons skilled in the art should understand that the steps of the method described above can be implemented by a general-purpose computing apparatus, and they can be centralized on a single computing apparatus or distributed over a network composed of a plurality of computing apparatuses. Optionally, they can be implemented using program code executable by a computing apparatus, so that they can be stored in a storage apparatus and executed by the computing apparatus, or they can be made into individual integrated circuit modules, or they can be implemented by making a plurality of modules or steps of them into a single integrated circuit module. As such, the present disclosure is not limited to any particular combination of hardware and software.

It should be understood that although several apparatuses or sub-apparatuses of the device are mentioned in the detailed description above, such division is merely exemplary rather than mandatory. In fact, the features and functions of the two or more apparatuses described above can be embodied in one apparatus according to the embodiments of the present disclosure. Conversely, the features and functions of one apparatus described above can be embodied by further dividing the apparatus into a plurality of apparatuses.

The foregoing presents exemplary embodiments of the present disclosure and is not intended to limit the present disclosure. For those skilled in the art, the present disclosure may have various changes and alterations. Any modification, equivalent replacement, improvement, and the like made within the spirit and principle of the present disclosure should all be encompassed in the protection scope of the present disclosure.

What is claimed is:

1. A method, comprising:
    acquiring, from an object storage system having a target file stored thereon in a manner accessible in a file-level granularity, a first set of metadata associated with downloading of the target file via a peer-to-peer protocol, wherein the first set of metadata comprises a plurality of data digests corresponding to a plurality of data blocks into which the target file is logically dividable for a multi-source transfer to a client device in accordance with the peer-to-peer protocol;

generating a second set of metadata based on the first set of metadata, the second set of metadata being in a format supported by a unified management system configured to provide a unified interface for access by one or more client devices to multiple distinct storage systems including the object storage system;

storing the second set of metadata in the unified management system to enable access to portions of the target file in a block-level granularity by the one or more client devices; and receiving a request from one of the one or more client devices to select individual ones of the plurality of data blocks through the unified management system.

2. The method of claim 1, wherein generating the second set of metadata comprises:

extracting the plurality of data digests from the first set of metadata;

determining a plurality of storage positions of the plurality of data blocks in the object storage system at least based on the plurality of data digests; and generating additional metadata to indicate mapping of the plurality of data digests to the plurality of storage positions.

3. The method of claim 2, wherein generating the second set of metadata further comprises:

creating a hierarchical structure based on the plurality of data digests, a plurality of leaf nodes of the hierarchical structure indicating the plurality of data digests respectively, and a parent node of the plurality of leaf nodes indicating an additional data digest generated based on at least two of the plurality of data digests.

4. The method of claim 3, wherein the plurality of data digests comprise hash values of the plurality of data blocks, and wherein the hierarchical structure comprises a hash tree.

5. The method of claim 3, wherein generating the second set of metadata further comprises:

extracting file identification information of the target file from the first set of metadata; and determining a root node of the hierarchical structure based on the file identification information to map a data digest indicated by the root node to a storage position of the file identification information.

6. The method of claim 1, wherein acquiring the first set of metadata comprises:

initiating a request for the first set of metadata of the target file to the object storage system through the unified management system;

wherein the first set of metadata comprises a torrent file.

7. The method of claim 1, wherein a first set of one or more data blocks of the target file are stored in the object storage system and a second set of one or more data blocks are stored in at least one other storage system of the multiple distinct storage systems, the second set of the one or more data blocks being different than the first set of the one or more data blocks.

8. An electronic device, comprising:

a processor; and a memory coupled to the processor and having instructions stored therein, wherein when executed by the processor, the instructions cause the device to perform actions comprising:

acquiring, from an object storage system having a target file stored thereon in a manner accessible in a file-level granularity, a first set of metadata associated with downloading of the target file via a peer-to-peer protocol, wherein the first set of metadata comprises a plurality of data digests corresponding to a plurality of data blocks into which the target file is logically dividable for a multi-source transfer to a client device in accordance with the peer-to-peer protocol;

generating a second set of metadata based on the first set of metadata, the second set of metadata being in a format supported by a unified management system configured to provide a unified interface for access by one or more client devices to multiple distinct storage systems including the object storage system;

storing the second set of metadata in the unified management system to enable access to portions of the target file in a block-level granularity by the one or more client devices; and receiving a request from one of the one or more client devices to select individual ones of the plurality of data blocks through the unified management system.

9. The electronic device of claim 8, wherein generating the second set of metadata comprises:

extracting the plurality of data digests from the first set of metadata;

determining a plurality of storage positions of the plurality of data blocks in the object storage system at least based on the plurality of data digests; and generating additional metadata to indicate mapping of the plurality of data digests to the plurality of storage positions.

10. The electronic device of claim 9, wherein generating the second set of metadata further comprises:

creating a hierarchical structure based on the plurality of data digests, a plurality of leaf nodes of the hierarchical structure indicating the plurality of data digests respectively, and a parent node of the plurality of leaf nodes indicating an additional data digest generated based on at least two of the plurality of data digests.

11. The electronic device of claim 10, wherein the plurality of data digests comprise hash values of the plurality of data blocks, and wherein the hierarchical structure comprises a hash tree.

12. The electronic device of claim 10, wherein generating the second set of metadata further comprises:

extracting file identification information of the target file from the first set of metadata; and determining a root node of the hierarchical structure based on the file identification information to map a data digest indicated by the root node to a storage position of the file identification information.

13. The electronic device of claim 8, wherein acquiring the first set of metadata comprises:

initiating a request for the first set of metadata of the target file to the object storage system through the unified management system;

wherein the first set of metadata comprises a torrent file.

14. The electronic device of claim 8, wherein a first set of one or more data blocks of the target file are stored in the object storage system and a second set of one or more data blocks are stored in at least one other storage system of the multiple distinct storage systems, the second set of the one or more data blocks being different than the first set of the one or more data blocks.

15. A computer program product, tangibly stored in a non-transitory computer-readable medium and comprising computer-executable instructions, wherein when executed, the computer-executable instructions cause a device to:

acquire, from an object storage system having a target file stored thereon in a manner accessible in a file-level granularity, a first set of metadata associated with downloading of the target file via a peer-to-peer protocol, wherein the first set of metadata comprises a plurality of data digests corresponding to a plurality of data blocks into which the target file is logically dividable for a multi-source transfer to a client device in accordance with the peer-to-peer protocol;

generate a second set of metadata based on the first set of metadata, the second set of metadata being in a format supported by a unified management system configured to provide a unified interface for access by one or more client devices to multiple distinct storage systems including the object storage system;

store the second set of metadata in the unified management system to enable access to portions of the target file in a block-level granularity by the one or more client devices; and receive a request from one of the one or more client devices to select individual ones of the plurality of data blocks through the unified management system.

16. The computer program product of claim 15, wherein generating the second set of metadata comprises:
   extracting the plurality of data digests from the first set of metadata;
   determining a plurality of storage positions of the plurality of data blocks in the object storage system at least based on the plurality of data digests; and
   generating additional metadata to indicate mapping of the plurality of data digests to the plurality of storage positions.

17. The computer program product of claim 16, wherein generating the second set of metadata further comprises:
   creating a hierarchical structure based on the plurality of data digests, a plurality of leaf nodes of the hierarchical structure indicating the plurality of data digests respectively, and a parent node of the plurality of leaf nodes indicating an additional data digest generated based on at least two of the plurality of data digests.

18. The computer program product of claim 17, wherein the plurality of data digests comprise hash values of the plurality of data blocks, and wherein the hierarchical structure comprises a hash tree.

19. The computer program product of claim 17, wherein generating the second set of metadata further comprises:
   extracting file identification information of the target file from the first set of metadata; and
   determining a root node of the hierarchical structure based on the file identification information to map a data digest indicated by the root node to a storage position of the file identification information.

20. The computer program product of claim 17, wherein acquiring the first set of metadata comprises:
   initiating a request for the first set of metadata of the target file to the object storage system through the unified management system;
   wherein the first set of metadata comprises a torrent file.

* * * * *